United States Patent [19]

Olson et al.

[11] 4,237,491
[45] Dec. 2, 1980

[54] TELEVISION CAMERA HIGHLIGHT DISCHARGE APPARATUS

[75] Inventors: Charles L. Olson, Oaklyn; Joseph F. Hacke, Lindenwold, both of N.J.

[73] Assignee: RCA Corporation, New York, N.Y.

[21] Appl. No.: 22,616

[22] Filed: Mar. 21, 1979

[51] Int. Cl.³ .............................................. H04N 5/34
[52] U.S. Cl. .................................................... 358/223
[58] Field of Search ................ 358/217, 219, 221, 223

[56] References Cited

U.S. PATENT DOCUMENTS

| 3,315,034 | 4/1967 | White | 178/7.2 |
|---|---|---|---|
| 3,610,823 | 10/1971 | Emmasingel et al. | 178/7.2 |
| 3,764,738 | 10/1973 | Zettl | 178/7.2 |
| 3,955,116 | 5/1976 | Van den Berg | 315/10 |
| 3,975,657 | 8/1976 | Sato et al. | 315/10 |
| 3,999,011 | 12/1976 | Sato et al. | 358/219 |
| 4,143,305 | 3/1979 | Gibson et al. | 358/223 X |

FOREIGN PATENT DOCUMENTS 821673 10/1959 United Kingdom .
1093806 12/1967 United Kingdom .

Primary Examiner—Robert L. Richardson
Attorney, Agent, or Firm—Eugene M. Whitacre; Paul J. Rasmussen; Robert L. Troike

[57] ABSTRACT

In a television camera having an electron scanning beam stabilizer circuit, a circuit for improved handling of highlights comprises means for forming an electrical signal corresponding to a pickup tube image highlight, limiting the magnitude of said signal to a predetermined level and utilizing that signal to form a highlight handling signal which causes the increase in beam scanning current necessary to discharge said highlight. In a color camera, the output from one pickup tube can be used to derive the signals necessary to control all three tubes simultaneously. A modified beam stabilizer circuit comprises means for allowing the beam current to increase without reduction by the beam stabilizer in order to discharge the highlight. A complementary signal derived from the highlight handling signal is applied to the modified beam stabilizer simultaneously with the highlight handling signal in order to neutralize the beam stabilizer.

4 Claims, 4 Drawing Figures

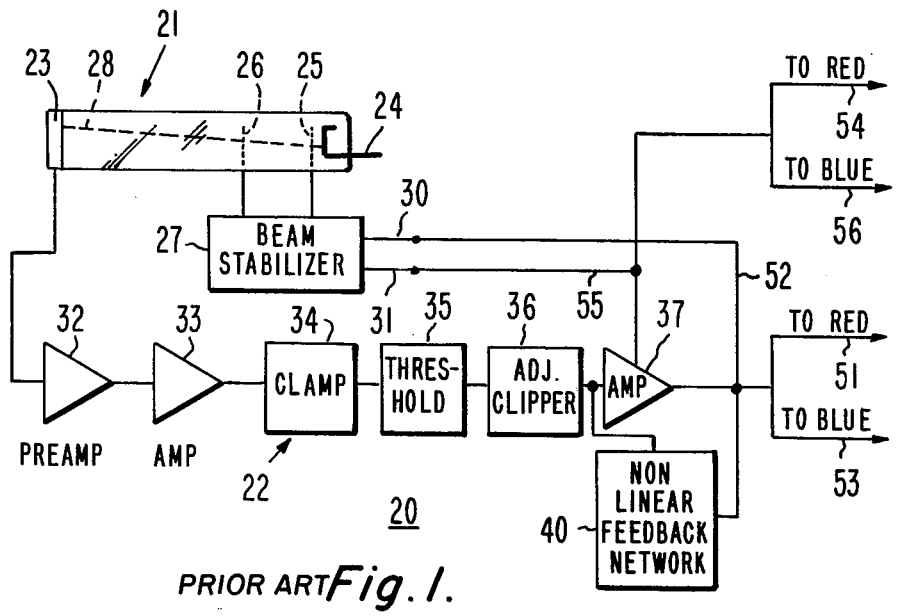
PRIOR ART Fig. 1.
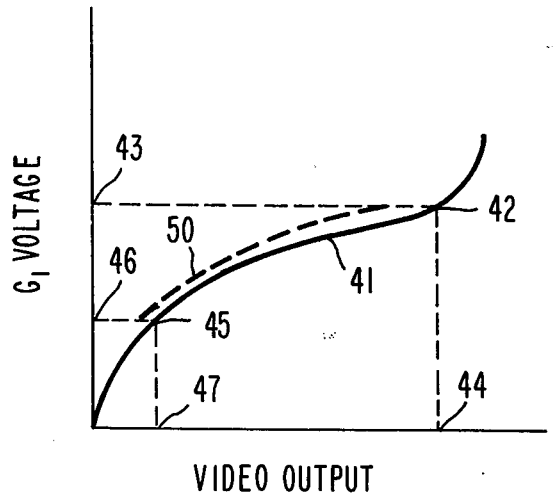
Fig. 2.

TELEVISION CAMERA HIGHLIGHT DISCHARGE APPARATUS

BACKGROUND OF THE INVENTION

This invention relates to television camera control and in particular to apparatus for improved image highlight discharge.

Television camera pickup tubes operate on the principle that light from an image strikes the photosensitive surface of the target of the tube. The target is a capacitor which is charged to cathode potential by the electron scanning beam. The light from the image discharges this capacitor and the scanning electron beam which scans the target in a predetermined pattern recharges the capacitor back to cathode potential. By measuring the current which flows to the target electrode during recharge by the electron beam and knowing the scanning pattern, it is possible to reproduce the tube image. The extent to which the target is recharged is determined by the current of the electron beam; the greater the beam current, the greater discharged potential that may be recharged. The electron beam current is determined by the tube control grid, or G1 voltage. Increasing G1 voltage increases beam current resulting in the ability to recharge a greater potential.

G1 voltage is normally set to allow the electron beam to recharge an image caused by a scene of normal brightness levels during a few scans of the electron beam. Because of the capacitor time constants involved, the electron beam will recharge the capacitors to approximately 70% of cathode potential in one scan. The subsequent scan will recharge 70% of the remaining potential difference. Therefore, the capacitors are recharged substantially to cathode potential in only a few scans. When scenes of high brightness levels are viewed, however, such as when the camera is faced toward a bright light or the sun, the target may be discharged to an extent that the potential of the electron beam is unable to recharge it fully, even with repeated scans. If the camera or the scene moves, the bright spots which were unable to be recharged will smear and move around, creating a comet-tail effect.

In order to eliminate this comet-tail effect, the G1 voltage and therefore the beam current must be increased to a level sufficient to recharge the target to cathode potential during the period of a few scan cycles. Operating the beam on a continual basis with enough current to discharge any highlights that may occur will eliminate comet-tailing but is undesirable for a number of reasons. One is that greater amounts of energy are consumed. Another is that increased beam current increases the size of the scanning spot, reducing the tube resolution. Still another reason for avoiding extended periods of elevated beam currents is to prolong tube life. High levels of beam current can appreciably shorten the life of the tube and can even cause tube damage. Further background information on camera tube operation and a discussion of highlight related problems can be found in U.S. Pat. No. 3,610,823.

A number of prior art methods have been used to increase beam current only in the presence of an image highlight with the remaining scanning done at the lower, normal beam current. The prior art methods, however, fail to eliminate many of the problems that occur in image highlight discharge. Among these is a method disclosed in U.S. Pat. No. 3,610,823 issued to Haenen. Haenen uses a continual increased beam current to one camera pickup tube. When the image output signal from that tube exceeds a threshold value, a control signal is generated which increases the beam current of the other tubes. This system, obviously, presents the problems of decreased resolution and shortened tube life of the tube having the increased beam current. Other prior art methods raise the beam current to a high level upon the sensing of an image highlight, without any regard for the highlight brightness level. This can result in circuit oscillation and decreased tube resolution.

SUMMARY OF THE INVENTION

The present invention provides an apparatus for discharging image highlights in a television camera pickup tube. Circuitry is provided which generates an electrical signal comprising highlight information from the output of the pickup tube. A signal shaping circuit is responsive to the electrical signal and generates a signal which is applied to a beam current stabilizer in such a way that the beam current increases to discharge the highlight without interference by the beam stabilizer.

DESCRIPTION OF THE DRAWINGS

FIG. 1 is a block diagram of the highlight suppression circuit of the present invention;

FIG. 2 is a graph showing the relationship between control grid voltage and the video output signal;

DETAILED DESCRIPTION

Figure 3:
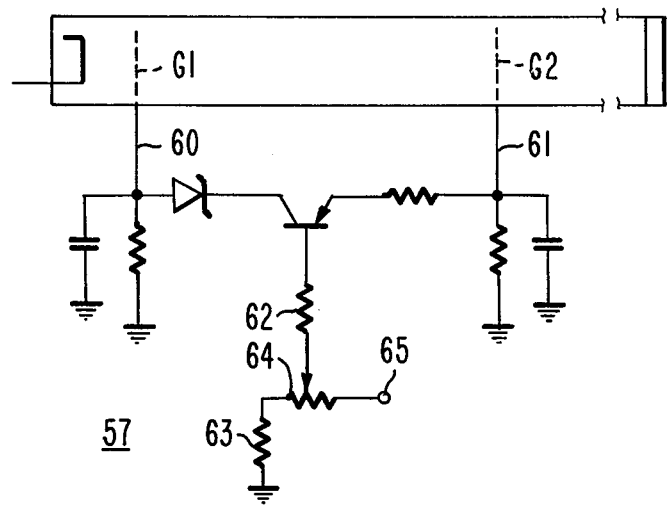
FIG. 3 is a schematic diagram of a prior art beam stabilizer.

Referring to FIG. 1, there is shown a highlight handling circuit 20 comprising a television camera image pickup tube 21 and signal generating circuitry 22. Methods and circuitry designed to handle and control image highlights have been designated with various terms by different manufacturers, among them: anti-comet tail (ACT), automatic beam operation (ABO) and comet tail suppression (CTS). The function of all these systems is to fully charge the image surface of the camera pickup tubes to cathode potential during the period of a few scans by the electron beam and thereby eliminate the undesirable effects that occur if the tube surface has not been fully recharged after scanning by the electron beam.

The pickup tube 21 comprises a target electrode 23 and a cathode 24 located at opposite ends of the tube 21. Control grid 25 or G1 and accelerator grid 26 or G2 are located within the tube 21 between the target electrode 23 and the cathode 24. The cathode 24 is heated to a point where electrons are boiled off. Holes in grids 25 and 26 act to form an electron beam 28 which is used to scan the target electrode 23. The energy of the electron beam 28 is determined by the control grid voltage.

The tube 21 also comprises conventional beam deflection and focusing components which are not shown. A beam stabilizer 27 is electrically connected to the control grid 25 and the accelerator grid 26. The beam stabilizer 27 acts to maintain constant electron beam current regardless of external changes in the control grid voltage and accelerator grid current. The beam stabilizer also incorporates inputs 30 and 31.

A preamplifier 32 amplifies the video output signal from tube 21. The input of preamplifier 32 is electrically connected to the target electrode 23 of tube 21. The video output is generated in the following manner. The photoconductor of the target electrode forms a myriad of capacitors or capacitive zones which are charged to the potential of the cathode by action of scanning electron beam. Light incident upon the target electrode from a viewed image discharges the capacitive zones of the target electrode. The degree or extent of electrode-capacitor discharge is proportional to the intensity of light incident upon the electrode. The discharged capacitive zones on the target electrode 23 are distributed in a pattern corresponding to light distribution of the scene being viewed. Areas of greater light intensity will discharge the electrode to a greater extent. The target electrode 23 then carries an image identical to that being viewed by the camera lens, with incident light levels represented by the magnitude of discharge of the electrode 23.

The electron scanning beam 28, comprising a stream of negatively charged particles, impinges upon the target electrode 23 in a predetermined pattern. As the scanning beam strikes the target electrode 23, it recharges the target electrode photoconductor surface. The scanning of the electron beam causes a current to flow from the target electrode 23 to the preamplifier 32. The current which flows is a signal of constantly varying amplitude, the amplitude of which is proportional to the magnitude of electrode potential that was discharged, which is directly proportional to the brightness of the scene being viewed.

The magnitude of charge that can be recharged by the scanning electron beam is proportional to the electron beam current, which in turn is proportional to the control grid 25 or G1 voltage. The electron beam current is typically adjusted to be able to fully recharge an area of discharge corresponding to light of normal brightness level, plus a reserve factor.

The reserve factor is often 100% normal brightness, which means that the electron beam is able to recharge a scene formed by light of two times normal brightness. During most camera operation, the scenes being viewed will have light levels below that of twice normal brightness. However, bright lights or bright areas caused by highly reflectively objects or the sun can discharge the target electrode corresponding to brightness levels of ten times and more normal brightness. It is practical to increase beam current only when it is necessary to recharge an area of high discharge. Although some prior art systems use an increased beam current during beam flyback or retrace, the present invention contemplates increasing the beam current only during the trace interval of each scanning cycle. The video output signal from the target electrode 23 is analyzed to determine highlight information that is used to generate signals that increase beam current enough to recharge the highlight area.

Referring again to FIG. 1, there is shown signal generating circuitry 22 comprising an amplifier 33, having its input connected to the output of preamplifier 32, a clamping circuit 34, having its input connected to the output of amplifier 33, threshold detector 35 having its input connected to the output of clamping circuit 34, and an adjustable clipper 36, having its input connected to the output of threshold detector 35.

The amplified video output signal from preamplifier 32 is further amplified by amplifier 33. The clamping circuit 34 clamps the video output signal at a predetermined threshold level. In the preferred embodiment, the threshold level would be set at a level corresponding to a video output level of approximately 1½ times normal brightness, since the beam current was set to have sufficient reserve to recharge a highlight area of twice normal brightness. The threshold level must be set to a level less than the maximum normal beam current. This results in a signal containing all components corresponding to highlights which exceed the threshold level. This is done by biassing the entire signal downward so that the clamped level is below the threshold level of threshold detector 35. The threshold detector 35 is made sensitive only to signals in excess of the threshold level, which corresponds to a video output of 1½ times normal brightness. The threshold detector 35 then is sensitive only to highlight signals that are near the recharge capabilities of the scanning electron beam.

The output from the threshold detector is a signal comprised only of highlight information. The signal varies in amplitude depending on highlight brightness. This highlight information signal is applied to the input of the adjustable clipper 36. The clipper 36 is adjustable to limit the highlight information signal to a predetermined maximum value. This maximum value corresponds to a highlight having a particular brightness level. The maximum value determined by the clipper 36 is dependent on the nature and type of camera pickup tubes used. Certain types of tubes are extremely susceptible to oscillation or tube damage if the electron beam current exceeds certain limits. Therefore, if beam current is increased to recharge a highlight area corresponding to a brightness level over a particular value, oscillation or tube damage can occur. Because of this, the clipper 36 is adjusted so that the maximum highlight signal level corresponds to a level of brightness below that which would cause tube oscillation or damage. For Saticon tubes, this level is approximately ten times normal brightness; for Plumbicon tubes, this level is about eight times normal brightness. The clipper 36 guarantees that the electron beam current will not increase beyond a predetermined level even if an image highlight occurs, which is greater in magnitude than that which can be recharged with this adjustment.

The signal generation circuitry 22 further comprises an amplifier 37 which incorporates a non-linear feedback network 40 connected between the output and input of the amplifier 37. The input of the amplifier 37 is also connected to the output of the clipper 36. The amplifier 37 thus receives the highlight information signal from the clipper 36, and generates a signal that increases the electron beam current in response to the highlight information signal.

The amplifier 37 and non-linear feedback network 40 act as a signal shaping means and operate in the following manner. Referring to FIG. 2, there is shown a graph illustrating the relationship between the control grid 25 voltage and video output from target electrode 23. This relationship is indicated by the solid line 41 on the graph. Since G1 voltage is directly proportional to electron beam current, the graph of FIG. 2 also gives an approximate relationship between beam current and video output.

From the graph, it can be seen that the upper portion of the curve 41 turns sharply upward, indicating that further increases in G1 voltage show no appreciable increase in video output. It is in this region that oscillation and tube damage can occur, so it is important to operate the tube with G1 voltage below this region. Point 42 on the curve 41 shows the approximate maximum limit that would be recommended, corresponding to a G1 voltage level given by point 43 and a video output level given by point 44. Point 44 corresponds to the maximum level of highlight brightness that can be recharged by the electron beam for a particular tube; as previously stated, this level is approximately 6–10 times normal brightness for Plumbicons and 10–20 times normal brightness for Saticons. Any actual highlight having a brightness level in excess of these limits would have its highlight information signal correspondingly reduced by the clipper 36. Point 45 illustrates the maximum point on curve 41 that can be attained during normal beam operation. Point 46 represents the maximum G1 voltage that is available to the pickup tube during normal operation. The G1 voltage at point 46 produces a video output level given by point 47. As stated previously, this represents a video output level corresponding to an image of two times normal brightness levels. It is clear, therefore, that point 46 also includes the maximum reserve beam current. Any highlight image having a brightness level corresponding to a video output greater than that of point 47 requires a G1 voltage greater than that of point 46. Since point 46 is the maximum available G1 voltage, a plot on the graph of FIG. 2 of any point having a video output greater than point 47 would fall somewhere below curve 41. Since insufficient beam current is available to fully recharge any image corresponding to a video output greater than point 47, it is clear that any G1 voltage vs. video output point that falls below curve 41 represents an image that remains discharged after electron beam scanning. It is important, therefore, to increase G1 voltage enough so that a plot of G1 voltage vs. video output for any image point falls on or above curve 41, in order to assure complete image highlight discharge. It is important, too, to realize that any point which falls much above curve 41 represents more G1 voltage and therefore beam current than is necessary to recharge the associated image. Excessive beam current can decrease tube resolution and shorten tube life.

The curve on the graph of FIG. 2 shown by dashed line 50 represents a practical ideal response curve of increasing G1 voltage in response to increased video output. It can be seen that curve 50 closely follows the path of curve 41, although slightly above it to insure total highlight discharge.

The non-linear feedback network 40 is designed to approximate curve 50 as nearly as possible. Therefore, the output of amplifier 37 will follow curve 50, and will generate a signal that will increase G1 voltage an appropriate amount based on the highlight information input and the internally generated curve 50. As can be seen in FIG. 1, the output signal from amplifier 37, which raises the beam current to discharge a highlight, is applied simultaneously to red pickup tube line 51, line 52, which in turn is connected to input 30 of beam stabilizer 27, and blue pickup tube line 53. By utilizing the video output from only one pickup tube to generate highlight discharge information for all three pickup tubes in a color camera, size and weight of the camera may be reduced. In the embodiment of the present invention, it has been found practical to operate the signal generating circuitry 22 in conjunction with the green pickup tube of a 3-tube color camera system. The green tube was selected because of the fact that the total video output ordinarily has its greatest signal component comprising output from the green pickup tube. When a highlight is detected at the green tube, however, beam current is increased in all three tubes simultaneously. The red pickup tube line 51 and the blue pickup tube line 53 are connected to the beam stabilizer associated with the red and blue tubes in the same manner as line 52 is connected to input line 30 of beam stabilizer 27.

In order to eliminate the possibility that a highlight occurring more prominently in either the red or blue tube would be missed by the green tube, it is of course possible to include independent highlight handling capabilities with each pickup tube. This would require additional signal generating circuitry 22 for each of the three pickup tubes, thereby increasing the size and weight of the camera.

It is also possible to provide quasi-independent highlight handling among all three pickup tubes while only requiring a single generating circuit 22. This is accomplished by applying the preamplifier output from all three pickup tubes to the inputs of a non-additive mixer. The non-additive mixer samples the preamplifier outputs and selects the greatest signal level for processing by circuitry 22. The beam currents of all three tubes continue to be controlled simultaneously by the single output from amplifier 37, but the use of the non-additive mixer guarantees that the tube beam currents will increase in response to any color highlight. This method also increases camera weight and requires additional space for components. Because of severe space and weight criteria, the preferred embodiment of the present invention uses only the green pickup tube output to generate the highlight discharge signals for all three tubes.

The amplifier 37 also generates a neutralization or control signal which is also applied to all three tubes simultaneously along red line 54, green line 55, which is applied to input line 31 of beam stabilizer 27, and blue line 56. The neutralization signal on lines 54 and 56 is connected to the red and blue beam stabilizer in the same manner as line 55 is connected to beam stabilizer 27. The neutralization signal is derived from the highlight discharge signal and is similar in waveform, but with opposite polarity and decreased amplitude. The purpose and operation of the neutralization signal will be described in connection with the discussion of the beam stabilizer.

The beam stabilizer is designed to maintain constant beam current, regardless of changes in control grid voltage or accelerator grid current. The beam stabilizer thus maintains a uniform video output signal for comparable light levels even though tube parameters may change through age or use.

Referring to FIG. 3, there is shown a typical prior art beam stabilizer circuit 57 shown electrically connected through connectors 60 and 61 respectively to the control grid G1 and accelerator grid G2 of a typical television camera pickup tube. Accelerator grid G2 current is determined by the beam current. A voltage reference level determined by the combination of resistor 62, resistor 63, variable resistor 64, and voltage source 65 is adjusted to give the desired beam current.

If the beam current decreases, the accelerator grid current will decrease also. G1 voltage must therefore increase to offset this drop, and hence beam current is increased to its desired level. An increase in beam current above the desired value increases G2 current and correspondingly lowers G1 voltage in order to decrease the beam current to its desired value.

It is obvious that a beam stabilizer of this type is incompatible with the highlight suppression circuitry previously described. If the G1 voltage is increased to supply the beam current to discharge a highlight G2 current will increase also, causing the beam stabilizer to reduce G1 voltage and hence beam current. The beam stabilizer then counteracts the effect of the highlight handling or discharge circuit.

Figure 4:
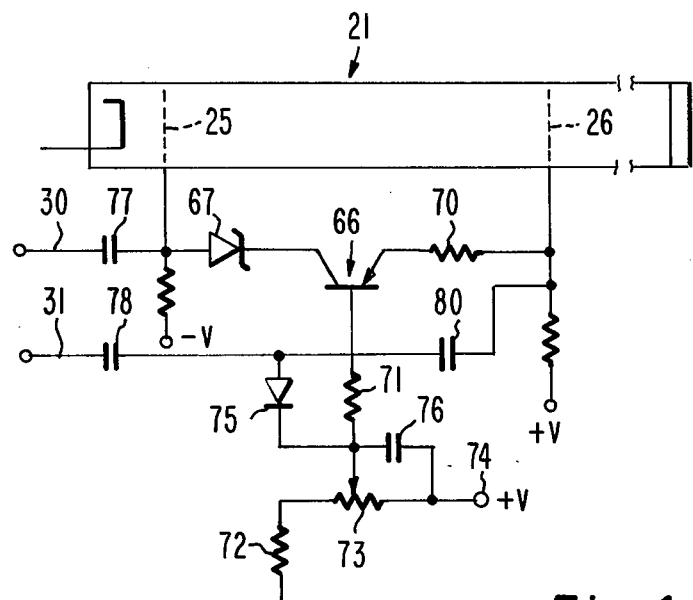
FIG. 4 is a schematic diagram of the beam stabilizer of the present invention.

Referring to FIG. 4, there is shown a modified beam stabilizer 27 of the present invention with electrical connections to G1 grid 25 and G2 grid 26 of the green pickup tube 21 of a television camera system.

The beam stabilizer 27 comprises a transistor 66 with its collector connected in series with zener diode 67 to G1 grid 25. The emitter of transistor 66 is connected in series with resistor 70 to G2 grid 26. The base of transistor 66 is connected to a voltage reference means determined by resistor 71, resistor 72, variable resistor 73, and a voltage source 74. Diode 75 is connected in parallel with resistor 71, with the anode of diode 75 connected to the base of transistor 66. A capacitor 76 is connected between the cathode of diode 75 and the voltage source 74.

Input line 30, connected to G1 grid 25, is the highlight discharge signal input means. Input line 31, connected to the base of transistor 66, is the beam stabilizer control signal input means. Capacitors 77 and 78 in input lines 30 and 31 AC couple the incoming signals on lines 30 and 31 to the beam stabilizer 27. The signal on input line 30 is the highlight handling or discharge signal on green output line 52 from amplifier 37. The signal on input line 31 is the neutralization signal on green line 55 from amplifier 37.

The highlight handling or discharge signal on line 30 is applied to G1 grid 25 which in turn increases beam current in order to discharge the associated highlight. The response of the entire highlight handling circuit 20 is quite fast; the signal rise time is on the order of 0.2 microsecond. This allows the highlight to be discharged during the same line scan on which it is first noticed. The 0.2 µS portion of the highlight which has been passed by the electron beam prior to beam current increase will be discharged due to the increased size of the scanning spot caused by the increased beam current.

The neutralization signal on input line 31 is applied to the base of transistor 66. This signal changes the voltage reference of the beam stabilizer in order to keep the beam stabilizer satisfied even with the highlight discharge signal on line 30 applied to G1.

The voltage reference is changed so that increases in G2 current due to increased beam current caused by the highlight suppression signal do not cause a corresponding drop in G1 voltage, since the voltage reference level remains constant in relation to the G2 current. The slow response time of the beam stabilizer is the reason both a highlight suppression signal and a control signal is necessary. A single signal that changed the voltage reference value of the beam stabilizer would cause a compensating change in G1 voltage, thereby causing the beam current to increase, but the increase would be too slow to discharge the highlight.

Diode 75 is employed to eliminate problems of signal sag due to high level or high duty cycle highlights. Without diode 75, coupling capacitor 77 and 78, capacitor 76 and filter capacitor 80 would slowly charge during high level highlights or highlights of high duty cycle, such as when the camera remains aimed at a large bright object. The charging of the capacitors causes the amplitude of the signal on lines 30 and 31 to decrease or sag, which results in highlight remaining partially undischarged. Worse, the voltage on lines 30 and 31 will be depressed by an amount equal to the average of the signal voltage following the highlight. This would cause desensitization to small highlights following a large highlight and could result in insufficient available beam current to discharge the normal brightness pattern.

Diode 75 is employed to clamp the signal on line 31 to the voltage reference on the beam stabilizer. This develops an average voltage which is added to the reference voltage. The amount is what is required to compensate for the sag in voltage on G1 25. The voltage is not equal to the voltage sag on G1. It differs by an amount dependent on the gain of the beam stabilizer.

It is important to note that this works equally well with highlights of any duty cycle and sensitivity to small highlights following large highlights is preserved.

The modified beam stabilizer circuitry previously described is incorporated into all three pickup tubes, although the input signals are derived only from the green tube.

What is claimed is:

1. An apparatus for discharging an image highlight in a television camera pickup tube, comprising:
   (A) means coupled to said pickup tube for forming an electrical signal representative of said highlight;
   (B) signal shaping means responsive to said electrical signal, for providing a control signal; and
   (C) a beam current stabilizer means normally providing a substantially constant scanning beam current, said stabilizer means including circuit means responsive to said control signal for providing increased scanning beam current during the trace period in the presence of said image highlight.

2. The apparatus for discharging an image highlight defined in claim 1, wherein the means coupled to the pickup tube further comprises clipping means responsive to said electrical signal for providing a signal having a fixed amplitude whenever said electrical signal exceeds a predetermined amplitude.

3. The apparatus for discharging an image highlight defined in claim 2, wherein the clipping means allows normal amplitude variation of said electrical signal whenever said electrical signal is below said predetermined amplitude.

4. The apparatus for discharging an image highlight defined in claim 1, wherein the beam stabilizer further comprises:
   (A) reference means for maintaining substantially constant electron beam current;
   (B) highlight discharge signal input means coupled to the pickup tube for applying a beam current-increasing highlight discharge signal to the pickup tube; and
   (C) beam stabilizer control signal input means coupled to said reference means for applying a control signal to said reference means whenever said highlight discharge signal input means is operative, whereby said reference means allows the beam current to increase responsive to said highlight discharge signal.

* * * * *

UNITED STATES PATENT AND TRADEMARK OFFICE
CERTIFICATE OF CORRECTION

PATENT NO. : 4,237,491

DATED : December 2, 1980

INVENTOR(S) : Charles L. Olson, et al.

It is certified that error appears in the above-identified patent and that said Letters Patent is hereby corrected as shown below:

In FIGURE 1, delete the legend "Prior Art" and in FIGURE 3, add the legend -- Prior Art --.

Signed and Sealed this

Fourteenth Day of April 1981

[SEAL]

Attest:

RENE D. TEGTMEYER

Attesting Officer     Acting Commissioner of Patents and Trademarks